United States Patent
Thorvaldsson

(10) Patent No.: US 8,674,666 B2
(45) Date of Patent: Mar. 18, 2014

(54) DEVICE FOR BALANCING A TRANSMISSION NETWORK

(75) Inventor: Björn Thorvaldsson, Kolbäck (SE)

(73) Assignee: ABB Technology Ltd., Zürich (CH)

( * ) Notice: Subject to any disclaimer, the term of this patent is extended or adjusted under 35 U.S.C. 154(b) by 1013 days.

(21) Appl. No.: 12/159,765

(22) PCT Filed: Dec. 30, 2005

(86) PCT No.: PCT/SE2005/002069
§ 371 (c)(1),
(2), (4) Date: Jan. 22, 2009

(87) PCT Pub. No.: WO2007/078218
PCT Pub. Date: Jul. 12, 2007

(65) Prior Publication Data
US 2009/0128102 A1    May 21, 2009

(51) Int. Cl.
*G05F 1/70* (2006.01)
(52) U.S. Cl.
USPC .................. 323/208; 323/207; 323/233
(58) Field of Classification Search
USPC ............... 323/207, 208, 233, 209; 307/14
See application file for complete search history.

(56) References Cited

U.S. PATENT DOCUMENTS

| | | | |
|---|---|---|---|
| 3,450,983 A | 6/1969 | Koppelmann et al. | |
| 4,689,735 A * | 8/1987 | Young | 363/155 |
| 4,717,833 A * | 1/1988 | Small | 307/44 |
| 5,321,598 A * | 6/1994 | Moran | 363/41 |
| 5,977,660 A * | 11/1999 | Mandalakas et al. | 307/105 |
| 6,201,715 B1 | 3/2001 | Huggett et al. | |
| 6,876,179 B2 * | 4/2005 | Chou et al. | 323/207 |
| 6,963,187 B2 | 11/2005 | Bebic et al. | |
| 2005/0116691 A1 * | 6/2005 | Bijlenga | 323/208 |
| 2006/0082354 A1 * | 4/2006 | Haugs et al. | 323/356 |

OTHER PUBLICATIONS

PCT/ISA/210—International Search Report—Aug. 25, 2006.

* cited by examiner

*Primary Examiner* — Adolf Berhane
*Assistant Examiner* — Fred E Finch, III
(74) *Attorney, Agent, or Firm* — Venable LLP; Eric J. Franklin

(57) ABSTRACT

A compensator for balancing an ac voltage network with a load connected between two phases. The compensator includes a voltage-source converter and a balancing device. The balancing device includes an inductance connected between phases before the load.

6 Claims, 1 Drawing Sheet

DEVICE FOR BALANCING A TRANSMISSION NETWORK

CROSS-REFERENCE TO RELATED APPLICATIONS

This application is the national phase under 35 U.S.C. §371 of PCT/SE2005/002069 filed Dec. 30, 2005.

TECHNICAL FIELD

The present invention relates to a device for power compensation of an ac voltage network with an uneven load. Such a device is known under the acronym FACTS (Flexible AC Transmission System). In particular, the invention relates to a device for balancing a transmission network with a plurality of phases and with a load between two phases only. The load is usually both resistive and inductive, such as, for example, an electrically rotating machine connected to the network via a converter.

BACKGROUND ART

It is known that the transmission power of an ac voltage network is reduced during reactive load and during uneven load of the three phases. Usually, the load is reactive and symmetrical. In this context, it is known to arrange a compensator comprising capacitors connectable to the network. It is also known to connect to the network a static compensator, usually designated SVC (Static Var Compensator) for balancing unsymmetries caused by unbalanced loads. Typical apparatus that may cause an unbalance in an ac network are, for example, arc furnaces. Another such load that may cause an unbalance is power supply of railways. Railway loads are often connected between two phase in the power network. To distribute the power output evenly between all the three phases of the power network, it is known to connect a static compensator, also called a load balancer. The compensator transfers power between the phases in such a way that the railway load together with the compensator is perceived by the power network as a symmetrical three-phase load.

A compensator is traditionally based on thyristor-controlled reactors, thyristor-controlled capacitors and fixed capacitor banks/filters. This technique is well established. A compensator may also be based on a voltage-source converter (VSC). Such a VSC comprises semiconductors with turn-off means and has a large field of operation. Use of this type of compensator, VSC, is also known.

Various devices for application within FACTS are known from, for example, U.S. Pat. No. 6,963,187.

SUMMARY OF THE INVENTION

The object of the invention is to suggest means and ways of improving the balancing of an unevenly loaded polyphase network.

This object is achieved according to the invention by a compensator and by a method.

According to the invention, the object is achieved by connecting to the polyphase network a compensator comprising a voltage-source converter, the working point of which is displaced so that the operating range covers substantially the necessary control range. This results in the advantage that a converter with a smaller operating range may be utilized. Such a displacement of the working point of the converter is achieved by causing the compensator to comprise a balancing device including reactive and capacitive elements connected between the phases in the network. These elements together form an offset bank for the negative-sequence current.

A voltage-source converter is able to create a negative-sequence current with an arbitrary phase position in relation to the positive-sequence system. The operating range of the converter may be described as a vector in a coordinate system where the possible control space is described by the surface of a circle oriented around the origin of coordinates. The negative-sequence current from a load containing active and reactive components and connected between two phases usually occurs in one and the same circular sector. If this sector is smaller than a quadrant, it is uneconomical to use a converter, the operating range of which comprises the whole circle. More than three-quarters of the operating range of the converter then do not fulfil any function in such an application.

By supplementing the converter with a balancing device comprising inductors and capacitors, the working point of the converter is displaced. A displacement of the working point corresponding to about half of the maximum balancing requirement permits the operating range of the converter to be reduced and its rated power to be halved. A balancing device comprising an offset bank consisting of discrete components containing inductors and capacitors connected between the phases creates a negative-sequence current with a fixed amplitude and direction.

An ac voltage network with three phases comprises a first phase, a second phase and a third phase, whereby, for example, a load is connected between the second and third phases. The balancing device according to the invention then comprises an inductance connected between the first and second phases and a capacitance connected between the first and third phases. The power value of the inductance and the capacitance is preferably equal. If the load contains an inductive component, such as usually an electric motor, the balancing device also comprises a supplementary capacitance connected between the second and third phases, that is, in parallel with the load.

In a coordinate system a negative-sequence current in the second quadrant is controlled by a corresponding positive-sequence current with the opposite direction. This negative-sequence current thus occurs in a quadrant opposite to the second quadrant, that is, in the fourth quadrant. To correctly control a negative-sequence current occurring within a circular segment, the working point of the converter must be displaced in the opposite direction. This working point is defined by a vector composed of the reactance and capacitance of the balancing device, the magnitude of which is determined by the power value of these and the angle of which is determined by the power value of the compensation capacitance. The effect of this procedure results in the coordinate system for the operating range of the converter being displaced such that the origin of coordinates ends up in the control range. In one embodiment, a favourable working point of the converter is achieved by controlling the power value of the capacitance and the inductance to about ½√3 (one by two times the root of three) of the maximum resistive load power. In a further embodiment, the power value of the compensation capacitance is controlled so as to correspond to half the angle of the circular segment.

In a practical embodiment, the capacitive and inductive elements between the phases may be designed as tuned harmonic filters. It is also part of the inventive concept to control the balancing device in fixed steps so that favourable working points for the converter are defined within the necessary circular segment. In case of a control need that, for longer periods or time, comprises a smaller region within the circular segment, a converter with an additionally reduced operating range may thus be utilized.

According to a first aspect of the invention, the task is fulfilled by a compensator for balancing an ac voltage network with a load connected between two phases, comprising a voltage-source converter and a balancing device, the balancing device comprising an inductance connected between the phases before the load and a capacitance connected between the phases after the load. In case of loads with an inductive component, the balancing device comprises a compensation capacitance connected in parallel with the load.

According to a second aspect of the invention, the object is achieved by a method for balancing an unevenly loaded polyphase network comprising a voltage-source converter, the method comprising displacing the control range of the converter by introducing an inductance between the phases before the load and by introducing a capacitance between the phases after the load. According to one embodiment, the displacement of the control range of the converter also comprises a rotation of the control range by introducing a capacitance in parallel across the load.

BRIEF DESCRIPTION OF THE DRAWINGS

The invention will be explained in greater detail by describing an embodiment with reference to the accompanying drawing, wherein.

DESCRIPTION OF PREFERRED EMBODIMENTS

Figure 1:
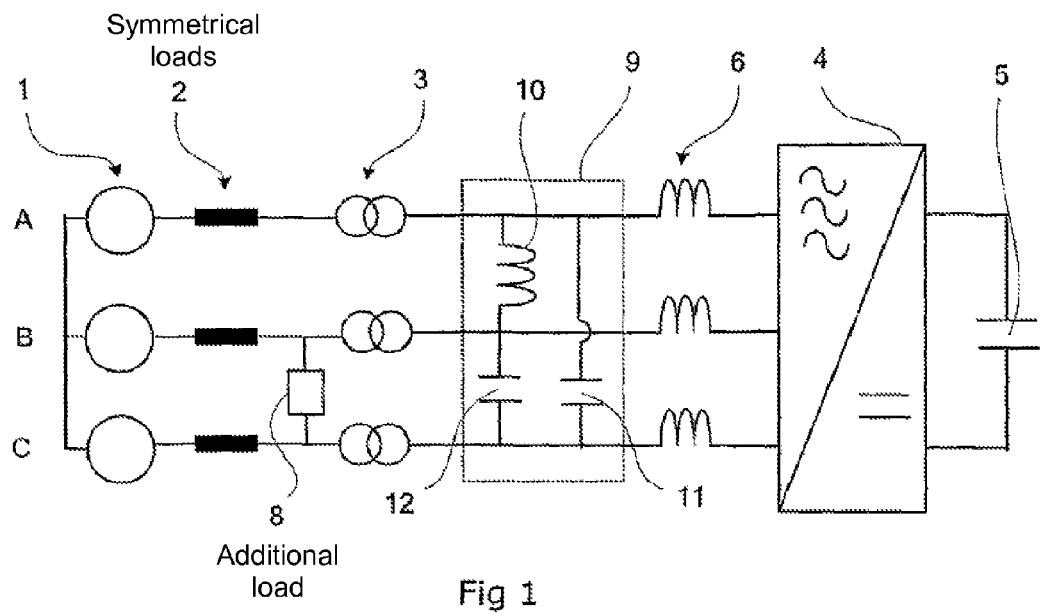
FIG. 1 is an ac voltage network with a load between two of the phases as well as a voltage-source converter and a balancing device.

FIG. 1 shows an ac voltage network 1 with three phases A, B and C with substantially symmetrical loads 2. Between the second phase B and the third phase C, an additional load 8 is unsymmetrically connected. The load 8 is only symbolically indicated and may include both resistive and inductive components. A compensation installation comprising a voltage-source converter 4 with a capacitor bank 5, reactors 6 and a balancing device 9 is connected to the ac voltage network by way of a transformer 3. The balancing device comprises an inductance 10 connected between the first phase A and the second phase B, and a capacitance connected between the first phase A and the third phase C. In the example shown, the balancing device also comprises a capacitance 12 connected in parallel with the load.

Figure 2:
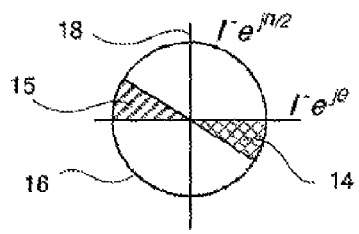
FIG. 2 is the necessary control range, that is, within which the load should lie.
Figure 3:
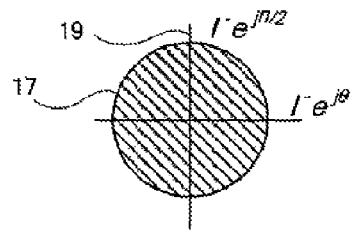
FIG. 3 is the working range of a converter.

FIG. 2 shows, in a coordinate system 18, that range within which the negative-sequence current normally lies for a load connected between two phases. The load range 15 constitutes a circular segment limited by the origin of coordinates as well as by the horizontal coordinate axis and by the circle 16 indicating the maximally necessary control possibility. To be able to properly control the load within the load range 15, the balancing device must comprise a control range 14 that constitutes a mirror image of the load range. FIG. 3 shows, in a second coordinate system 19, the operating range 17 of the voltage-source converter in the form of the negative-sequence current. Since a voltage-source converter is able to control the negative-sequence current in all directions, the operating range constitutes a circle centred about the origin of coordinates.

Figure 4:
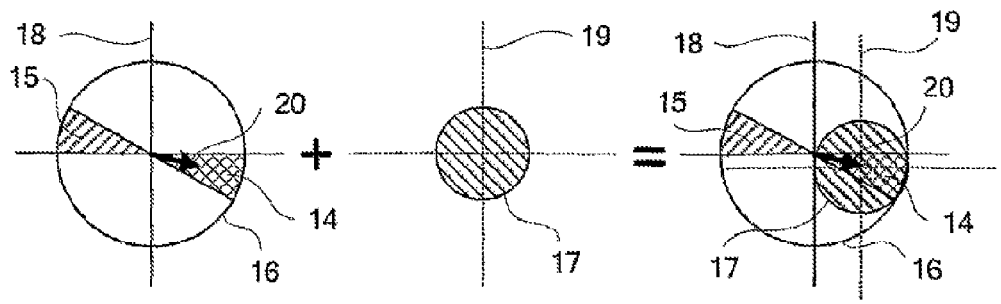
FIG. 4 is the control range resulting from the converter and the balancing device.

FIG. 4 shows the operating range of the combination of a voltage-source converter adjusted by the balancing device according to the invention. The figure shows three coordinate systems, of which the lefthand system in the figure relates to the necessary control range, the central system relates to the operating range of the converter, and the righthand system relates to the total power of the converter and the balancing device. The necessary control range 14 in the first coordinate system 18 is the same as in FIG. 2 and corresponds to the mirror image of the load range 15. In the first coordinate system, a vector 20 is also indicated for displacing the working point of the converter that is created by the balancing device. The second coordinate system 19 is, in principle, the same as in FIG. 3 but in FIG. 4 the operating range is reduced by selecting a converter with a considerably lower rated power. The third coordinate system, which is a combination of the first coordinate system 18 and the second coordinate system 19, shows how the operating range 17 of the converter is displaced with the aid of the displacement vector 20 such that the operating range 17 of the converter, which is introduced with a smaller rated power, covers the necessary control range 14.

Study a case with a load with the active power P and the power factor cos ω connected between the b and c phases. The network has the principal voltage $V_{l-l}$.

$$I_{load} = \frac{P}{V_{l-l}\cos\varphi}$$

The voltage phase-to-ground in phase a is used as a reference phase and is assigned the angle zero. It is obvious that the phase currents are $$\vec{I}_a = 0 \text{ and } \vec{I}_c = -\vec{I}_b$$

Thus, with the aid of the general equations for symmetrical components $$\vec{I}^+_{load} = \frac{1}{3}\left[e^{j(\frac{2\pi}{3})} - e^{-j(\frac{2\pi}{3})}\right]\vec{I}_b = \frac{1}{\sqrt{3}}e^{j\frac{\pi}{2}}I_{load}e^{-j(\frac{\pi}{2}+\varphi)} = \frac{1}{\sqrt{3}}I_{load}e^{-j(\varphi)}$$

$$\vec{I}^-_{load} = \frac{1}{3}\left[e^{-j(\frac{2\pi}{3})} - e^{j(\frac{2\pi}{3})}\right]\vec{I}_b = \frac{1}{\sqrt{3}}e^{-j\frac{\pi}{2}}I_{load}e^{-j(\frac{\pi}{2}+\varphi)} = \frac{1}{\sqrt{3}}I_{load}e^{-j(\pi+\varphi)}$$

$$\vec{I}^0 = 0$$

A system of reactive elements connected between the phases—an offset bank—gives rise to the following sequence currents $$\vec{I}^+_{Offsetbank} = \frac{1}{V}[Q_{ab} + Q_{bc} + Q_{ca}]e^{j\frac{\pi}{2}}$$

$$\vec{I}^-_{Offsetbank} = \frac{1}{V}\left[Q_{ab}e^{j\frac{5\pi}{6}} + Q_{bc}e^{-j\frac{\pi}{2}} + Q_{ca}e^{j\frac{\pi}{6}}\right]$$

To balance the unsymmetrical load, a negative-sequence current in phase opposition to the negative-sequence component in the load current need be generated. The active component in the load current is balanced by connecting an inductor between phase A and phase B and a capacitor between phase C and phase A.

$$\vec{I}^-_{Offsetbank_{aktiv}} = \frac{1}{V}\left[Q_{ab}e^{j\frac{5\pi}{6}} + Q_{ca}e^{j\frac{\pi}{6}}\right]$$

The reactive component of the load is balanced by connecting a capacitor between phase B and phase C $$\vec{I}^-_{Offsetbank_{reaktiv}} = \frac{1}{V}\left[Q_{bc}e^{-j\frac{\pi}{2}}\right]$$

So as not to generate a positive-sequence current, all the components in the phases are adjusted in an inductive direction:

$$\vec{I}^+_{Offsetbank} = \frac{1}{V}[Q_{ab} + Q_{bc} + Q_{ca}]e^{j\frac{\pi}{2}} = 0$$

The offset bank is selected such that about half the need of maximum negative-sequence current is obtained. The angle is selected to about half the maximum angle for the load range. The total instantaneous need is satisfied by the VSC converter contributing the difference between the need and the current of the offset bank. It is to be noted that to achieve an arbitrary point in the operating range after the displacement with the discrete components, the converter needs to be able to generate a negative-sequence current in all directions.

Although advantageous, the invention is not limited to the embodiments shown, but also comprises embodiments that are obvious to a person skilled in the art. Thus, as stated before, the invention comprises the case where the balancing device is controlled in a stepwise manner. Further, as indicated above, the invention comprises the case where the balancing device is built together with a filter, if any, for filtering away system resonances and harmonics from the converter.

The invention claimed is:

1. A compensator for balancing an ac voltage network comprising a sequence of a first phase, a second phase and a third phase with an unsymmetrically connected load connected between the second phase and the third phase in the sequence of phases, the compensator comprising:
   a voltage-source converter; and
   a balancing device, wherein the balancing device comprises an inductance connected between the first phase and the second phase, and a capacitance connected between the third phase and the first phase, wherein the balancing device is configured to create a negative-sequence current with fixed amplitude and direction,
   wherein the compensator is configured to balance the load within a load range, wherein the balancing device is configured to provide about one-half of a current for an operating range of the voltage source converter, and wherein the voltage source converter is configured to provide a difference between a total current of the compensator and the current of the balancing device.

2. The compensator according to claim 1, wherein the balancing device further comprises a compensation capacitance connected in parallel with the load.

3. The compensator according to claim 1, wherein a power value of the inductance and the capacitance is substantially equal.

4. The compensator according to claim 3, wherein the power value of both the inductance and the capacitance contains a maximum resistive load power divided by two times a root of three.

5. A method for balancing an unevenly loaded polyphase network comprising a sequence of a first phase, a second phase and a third phase with a voltage-source converter, the three phase network having an unsymmetrically connected load connected between the second phase and the third phase, the method comprising:
   displacing an operating range of the voltage source converter with a balancing device including an inductance and a capacitance, wherein the balancing device is configured to create a negative-sequence current with fixed amplitude and direction;
   introducing the inductance between the first phase and the second phase;
   introducing the capacitance between the third phase and the first phase, wherein the balancing device is adapted for providing about one-half of a current for the operating range; and
   providing with the voltage source converter a difference between a total current of the compensator and the current of the balancing device.

6. The method according to claim 5, wherein displacement of an operating range comprises a rotation of a control range by introducing a second capacitance, wherein the second capacitance is introduced in parallel across the load.

* * * * *